(12) United States Patent
Ciet et al.

(10) Patent No.: US 8,036,378 B2
(45) Date of Patent: Oct. 11, 2011

(54) SYSTEM AND METHOD OF AUTHENTICATION

(75) Inventors: Mathieu Ciet, Paris (FR); Augustin Farrugia, Cupertino, CA (US); Jean-Francois Riendeau, Santa Clara, CA (US); Nicholas T. Sullivan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 755 days.

(21) Appl. No.: 12/116,770

(22) Filed: May 7, 2008

(65) Prior Publication Data
US 2009/0279689 A1 Nov. 12, 2009

(51) Int. Cl.
*H04L 9/28* (2006.01)
(52) U.S. Cl. .............. 380/28; 726/2; 713/168; 713/169; 713/170; 713/171
(58) Field of Classification Search .................... None
See application file for complete search history.

(56) References Cited

U.S. PATENT DOCUMENTS

| | | | |
|---|---|---|---|
| 7,349,878 B1 * | 3/2008 | Makivic | 705/37 |
| 2001/0024457 A1 * | 9/2001 | Barry et al. | 370/537 |
| 2003/0182246 A1 | 9/2003 | Johnson et al. | |
| 2004/0172535 A1 * | 9/2004 | Jakobsson et al. | 713/168 |
| 2007/0244951 A1 | 10/2007 | Gressel et al. | |

OTHER PUBLICATIONS

Fischer et al., "Validation of FDT calibration method in complex media", Optical Trapping and Optical Micromanipulation V, Proc. of SPIE, vol. 7038, 703822, (2008).

* cited by examiner

*Primary Examiner* — Taghi Arani
*Assistant Examiner* — Amir Mehrmanesh
(74) *Attorney, Agent, or Firm* — Ryan C. Durham; Novak Druce + Quigg LLP

(57) ABSTRACT

Disclosed herein are systems, methods and computer readable media for performing authentication. The proposed scheme utilizes new algorithms that introduce randomness using a physical value for authentication. An exemplary method includes sharing an initial state value S(0) with a sender and a receiver, generating a sender S(t, v) based on a parameter t and an identifier v and based at least in part on the value S(0). The method includes generating a receiver S(t, v) from S(0) based on the parameter t and the identifier v wherein the parameter t is related to a physical value in authenticating the identifier v based on a comparison of the sender S(t, v) and the receiver S(t, v). The process of generating the sender S(t, v) and the receiver S(t, v) includes a random variable generated by a process such as by a random number generator, the Brownian Motion or Wiener Process. Other embodiments do not use the physical value for authentication.

24 Claims, 8 Drawing Sheets

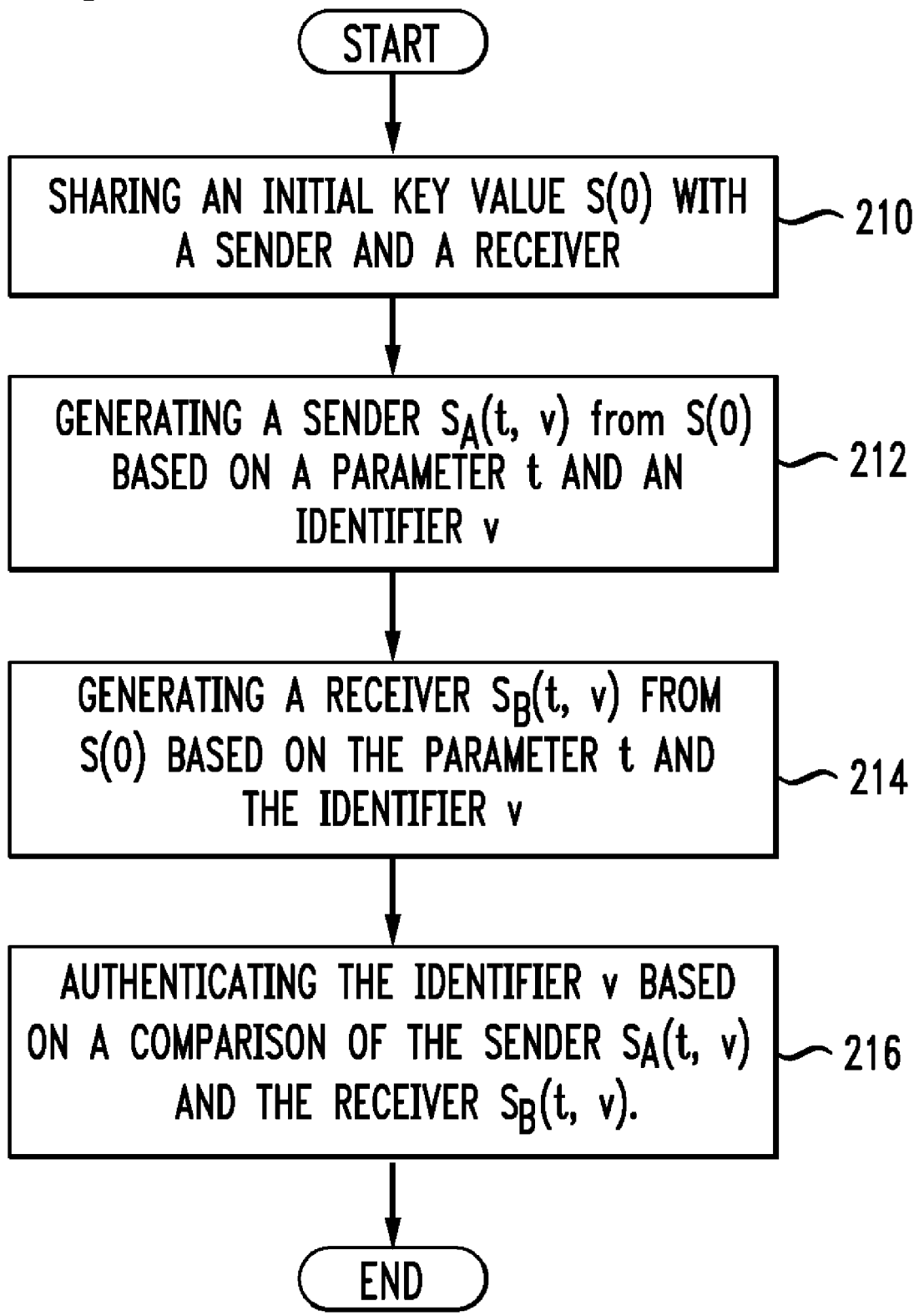

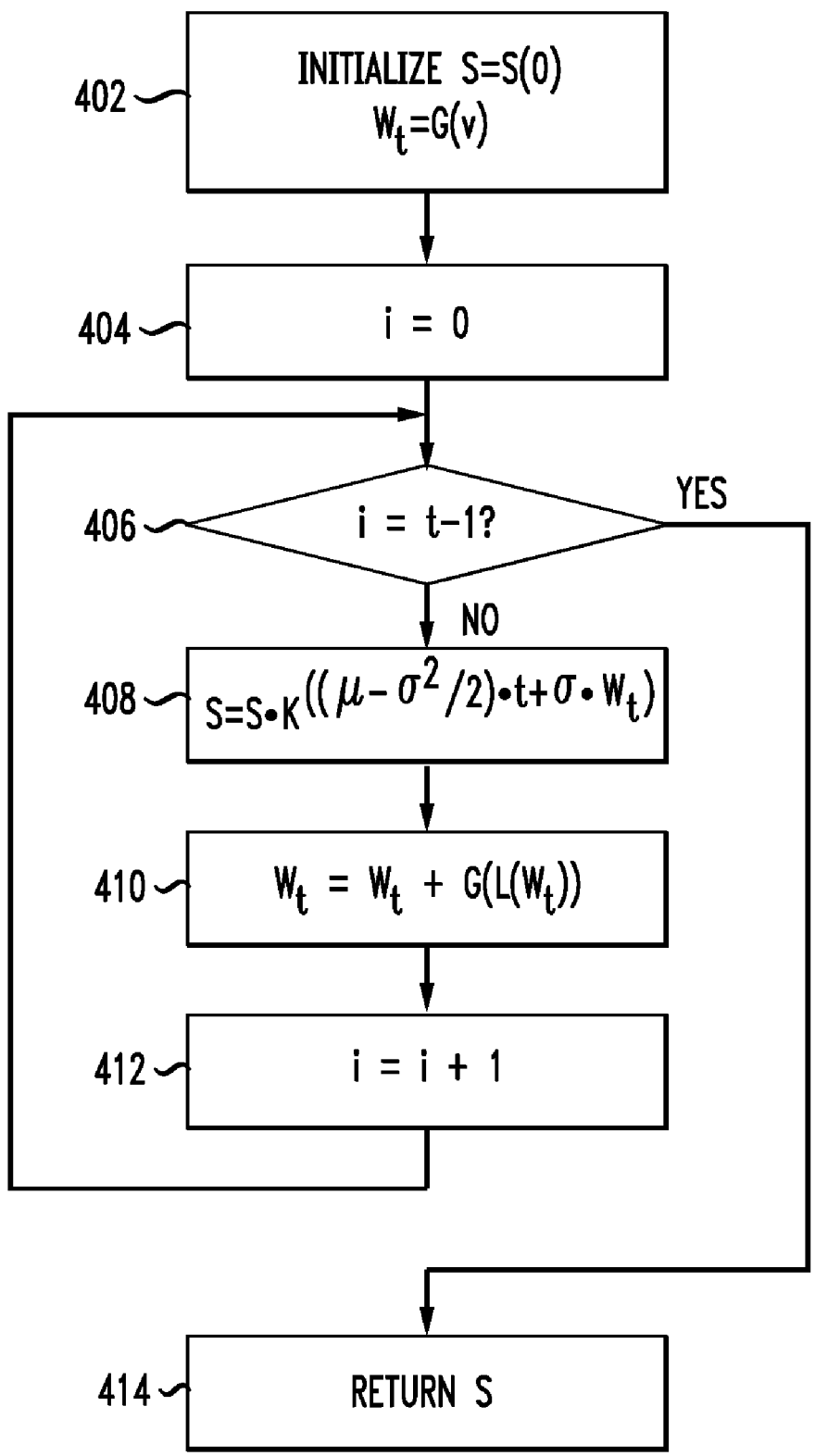

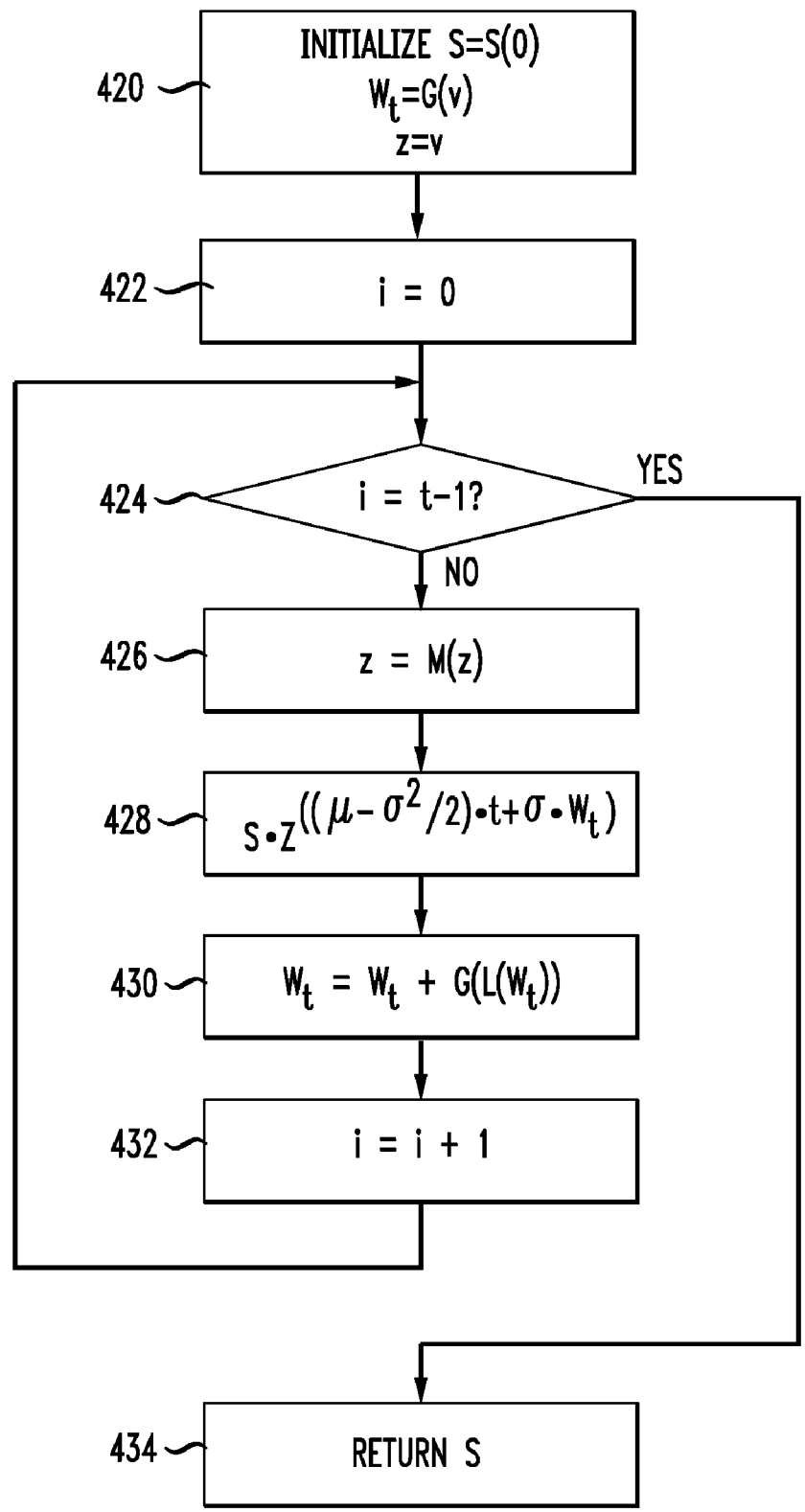

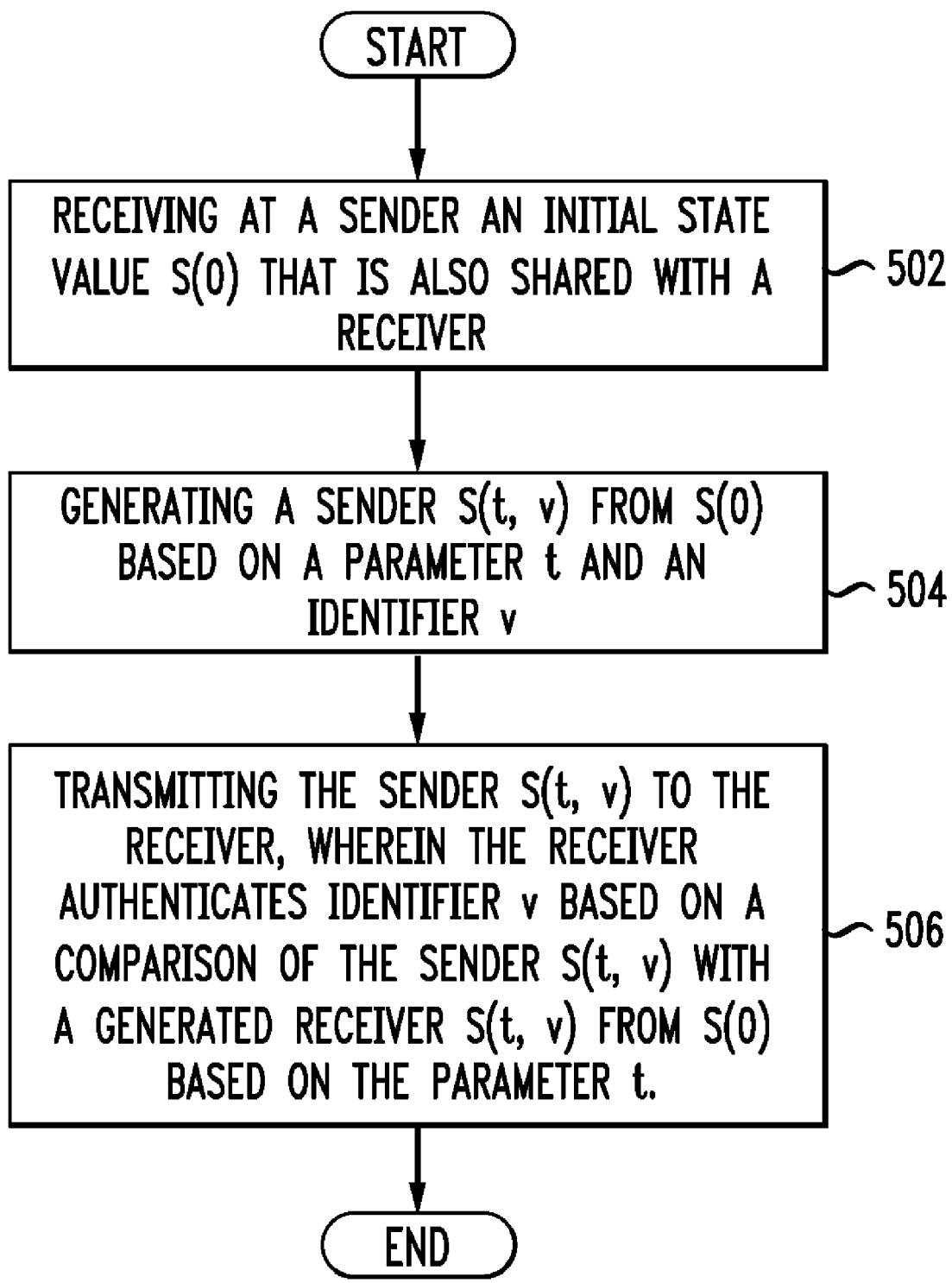

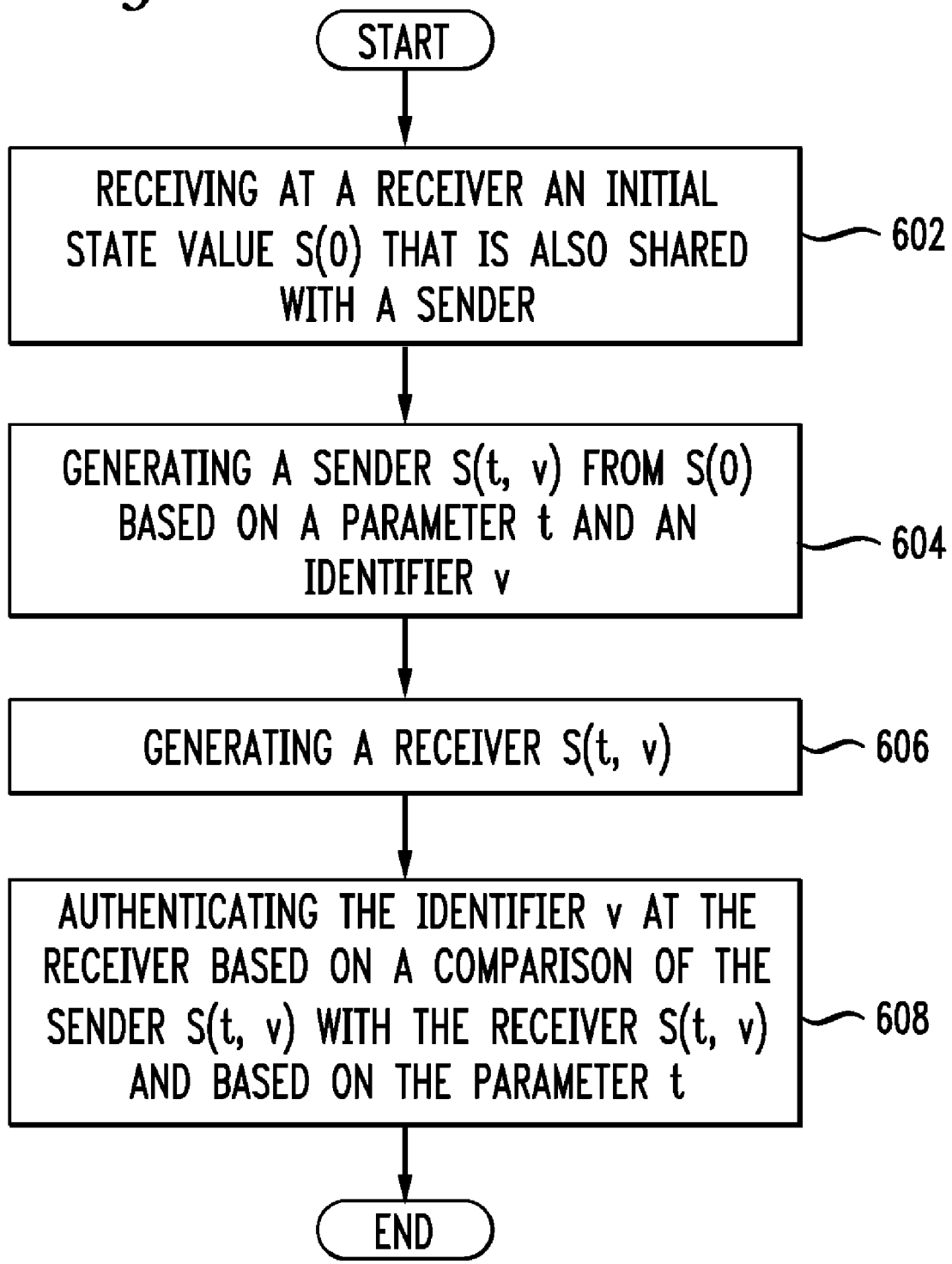

SYSTEM AND METHOD OF AUTHENTICATION

BACKGROUND OF THE INVENTION

1. Field of the Invention

The present invention relates to authentication and more specifically to a system and method of providing authentication based on a process that utilizes, in one aspect, a physical theory or a physical value such as time and in another aspect, a random value.

2. Introduction

Protection of digital content transferred between entities over a network is a principal element of computer security. Computer security includes protection of digital content from theft or corruption, or preservation of system availability. Authentication plays an important role in computer security. Authentication is the process of verifying the digital identity of the sender of a communication. Once an entity has been authenticated, data transfer between the two entities may begin.

Authentication systems provide differing levels of functionality. At a minimum, they allow a recipient to verify that a message originated from a particular user, program or computer. More powerful systems can ensure that messages cannot be copied and replayed in the future, prove to a third party that a message originated with a particular user (non-repudiation), or require multiple users to validate a message.

Authentication is often used in conjunction with cryptography. Cryptography is the traditional method of protecting data. Cryptography protects communications between two mutually trusting parties from thievery or hackers by attack on the data in transit. Encryption is the process of obscuring information in a systematic way, using an algorithm. Decryption is process of removing the protection and retrieving the original data. When using symmetric encryption, encryption and decryption use a key, which is the shared secret that both parties must have. To ensure data integrity, only the authorized parties should hold the secret key. This approach may differ when using asymmetric schemes such as RSA, which is an algorithm for public-key cryptography.

In many communication systems, the weakest link in security is not the encrypted data but rather cryptographic key management and handling. Unauthorized users may gain access to sensitive data when key management is not performed securely.

To date, many processes for authenticating an entity have been proposed. Typically, a sender sends a message and both the sender and receiver use the message and a shared secret key to generate a signature. If the signatures are the same, the entity is accepted as authentic. Due to advancing technology and more sophisticated hacking techniques, there is a need for improved key management techniques.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods and computer readable media for providing an authentication scheme. In a method embodiment, the method includes sharing an initial state value $S(0)$ with a sender and a receiver, generating a sender $S(t, v)$ from $S(0)$ based on a parameter t and an identifier v, and generating a receiver $S(t, v)$ from $S(0)$ based on the parameter t and the identifier v. The parameter t is related to a physical value in one aspect and may not be related to a physical value in another aspect of the disclosure. The method concludes with authenticating the identifier v based on a comparison of the sender $S(t, v)$ and the receiver $S(t, v)$. An example of the parameter t is a time value that could be associated with a current time, a time relative to an event or some other identifying parameter.

The step of generating the sender $S(t, v)$ and the receiver $S(t, v)$ can be performed using an updater function derived from a solution to a stochastic differential equation. The Brownian Motion or Weiner Process relate to stochastic differential equations. Another aspect of this disclosure is the updater function that may be derived from a solution to the stochastic differential equations. For example, the updater function derived from the solution to a stochastic differential equation can be implemented as follows:

$S=S(0);$ $W_t=G(v);$ for i from 0 to t−1:

$S=S*K((\mu-(\sigma^2)/2)*t+\sigma*W_t);$ $W_t=W_t+G(L(W_t));$ and return S, wherein (1) the G function performs a splitting operation, Hamming weight computation and enlarging of a repartition of identifier v, and (2) the L function is one of an encryption or a hash function. The K function is an exponential function or the like and in one embodiment, K is not an exponential function. This makes the calculation much easier because the system will not have to calculate a value with an infinite number of digits beyond the decimal point, i.e., this approach transitions from the continuous to the discrete. Furthermore, for security purposes, the K function replaces the exponential function to prevent the need for any call to an external library.

Other embodiments of the invention focus on processing the various steps from a sender centric or a receiver centric point of view. For example, the method of authentication from the sender point of view includes receiving at a sender an initial state value $S(0)$ that is also shared with a receiver, generating a sender $S(t, v)$ from $S(0)$ based on a parameter t and an identifier v, wherein the parameter t is based on a physical value and transmitting the sender $S(t, v)$ to the receiver, wherein the receiver authenticates identifier v based on a comparison of the sender $S(t, v)$ with a generated receiver $S(t, v)$ from $S(0)$ based on the parameter t.

Similarly, from a receiver point of view, the method includes receiving at a receiver an initial state value $S(0)$ that is also shared with a sender, receiving a sender $S(t, v)$ from $S(0)$ based on a parameter t and an identifier v, wherein the parameter t is based on a physical value, generating a receiver $S(t, v)$ and authenticating the identifier v at the receiver based on a comparison of the sender $S(t, v)$ with the receiver $S(t, v)$ and based on the parameter t.

Often, encryption schemes employ an element of randomness. Pseudo-random number generators are frequently employed in producing numbers for algorithms. However, these generators are not truly random. The only way to get truly random numbers is to use random processes. In one possible embodiment, a random number generator can also be used, for instance to generate a challenge with t to authenticate. The initial value and parameters may be kept secret and shared. The proposed authentication scheme employs randomness using the Wiener Process. The scheme seeks to define a function in which at any given step, the next step or the previous step cannot be predicted. Randomness in the scheme provides a layer of complexity, and hence increased security to the algorithm.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2B illustrates an example method embodiment;
FIGS. 4A and 4B illustrate method embodiments;
FIG. 5 illustrates another method embodiment;
and
FIG. 6 illustrates another method embodiment.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
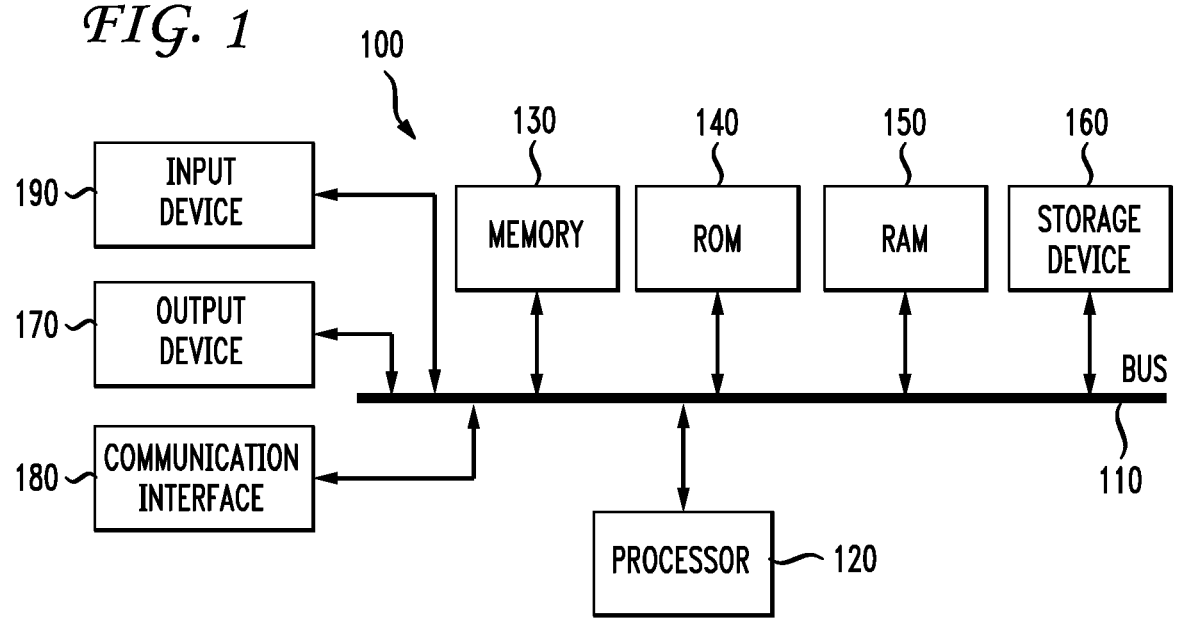
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Turning to the authentication scheme disclosed herein, the disclosure first presents some general information on Brownian Motion. Brownian Motion is the random movement of such things as particles suspended in liquid or gas or a mathematical model used to describe such random movement. There are many real world applications of Brownian Motion, for instance describing stock market fluctuations. Brownian Motion also presents some of the simplest continuous-time stochastic processes and is a limit of both simpler and more complicated stochastic processes. Concepts disclosed herein relate to constructing a cryptographically useful function from a process such as Brownian Motion which describes random events. The result of using such processes is to improve the security of the overall system.

A Wiener Process is also a continuous-time stochastic process. The Wiener Process $W_t$ is characterized by three basic facts. (1) $W_0=0$, (2) $W_t$ is continuous, (3) $W_t$ has independent increments with distributions $W_t-W_s \sim N(0, t-s)$ (for $0 \leq s < t$), where N denotes a normal distribution. Note that the exponential of random variables following the Brownian Motion, as well as the Wiener Process, represents a continuous-time stochastic model. The Brownian Motion is already used for various applications where stochastic compartments have to be modeled. A stochastic differential equation is a differential equation in which one or more of the terms are a stochastic process thus resulting in a solution which is itself a stochastic process. Typically, they incorporate white noise which can be thought of as the derivative of Brownian Motion or the Wiener Process. Other types of random fluctuations are also possible. In one possible embodiment, a random number generator can also be used, for instant to generate a challenge with t to authenticate. The initial value and parameters may be kept secret and shared.

The following illustrates a stochastic differential equation:

$$dS_t = \mu * S_t * d_t + \sigma * S_t * dW_t$$

where $\{Wt\}$ is a Brownian Motion or a Wiener Process and $\mu$ and $\sigma$ are two constants representing the drift and volatility respectively. The solution to the previous equation is given by: $S_t = S_0^{((\mu - \sigma^2/2)*t + \sigma*Wt)}$, in which $S_0$ is to the power of $((\mu - \sigma^2/2)*t + \sigma*Wt)$. In the above solution, $S_0$ is the initial state and $\mu$ and $\sigma$ are constants as in the stochastic differential equation above. A normal distribution $N(\mu, \sigma^2)$ denotes the normal distribution with expected value u and the variance or standard deviation $\sigma^2$. This is also known in the art as a Gaussian or normal distribution. The condition that $W_t$ has independent increments means that if $0 < s \leq s_t \leq t_1 \leq s_2 \leq t_2$ then $W_{t1} - W_{s1}$ and $W_{t2} - W_{s2}$ are independent random variables. The probability density function of the normal distribution is the Gaussian function: $1/(\sigma * \sqrt{(2\Pi)})^{\wedge}(-((x-\mu)^{\wedge}2/(2*\sigma^{\wedge}2)))$, where "^" represents an exponential.

Given all of this information, the issue is how values can be generated respecting the normal distribution. The present disclosure addresses this problem. One possible approach is to use a Box-Muller transformation. This is the method of generating pairs of independent standard normally distributed random numbers with zero expectation in unit variance given a source of uniformly distributed random numbers. The Box-Muller transformation is known to those of skill in the art. However, from a practical point of view, this approach is not efficient enough.

In another approach, one can use the moment generating function which is defined as an expontial: $Exp(\mu*t+(\sigma^2*t^2)/2)$, in which the exponent of the above equation is defined by $(\mu*t+(\sigma^2*t^2)/2)$. However, from a practical point of view, this would also be a costly calculation to solve for the value of the exponential. Furthermore, such a calculation may require a call to an external function which can affect the security of the algorithm.

The third proposed approach is preferred because it is simple and based on a physical solution and has the following property. Given data uniformly distributed, the Hamming weight satisfies a normal distribution. The Hamming weight of a string is the number of non zero symbols or elements in a binary decomposition. For the most typical case, a string of bits, the Hamming number is the number of ones in the strings. Therefore, for the bit string 11101, the Hamming weight is four. Similarly, for the bit string 11101000, the Hamming weight is also four. Those of skill in the art will understand that the Hamming weight satisfies the normal distribution. This can be shown, for example, by taking a bitstream and navigating through a binary tree using the values in the bitstream to indicate right or left branch decisions within the binary tree. Because each branch in the tree represents a ½ probability of selection, using the Hamming weight satisfies the normal distribution.

From a practical point of view, the main disadvantages that given input numbers of L-bits, one can obtain numbers between $\{0, \ldots, L\}$. This can be a problem since one would like to have more input bits in the process. For example, in a range of 256-bit numbers, the Hamming weight distribution from that range is not as large as is desirable. Note that we are also working now in a non-continuous environment.

Figure 3:
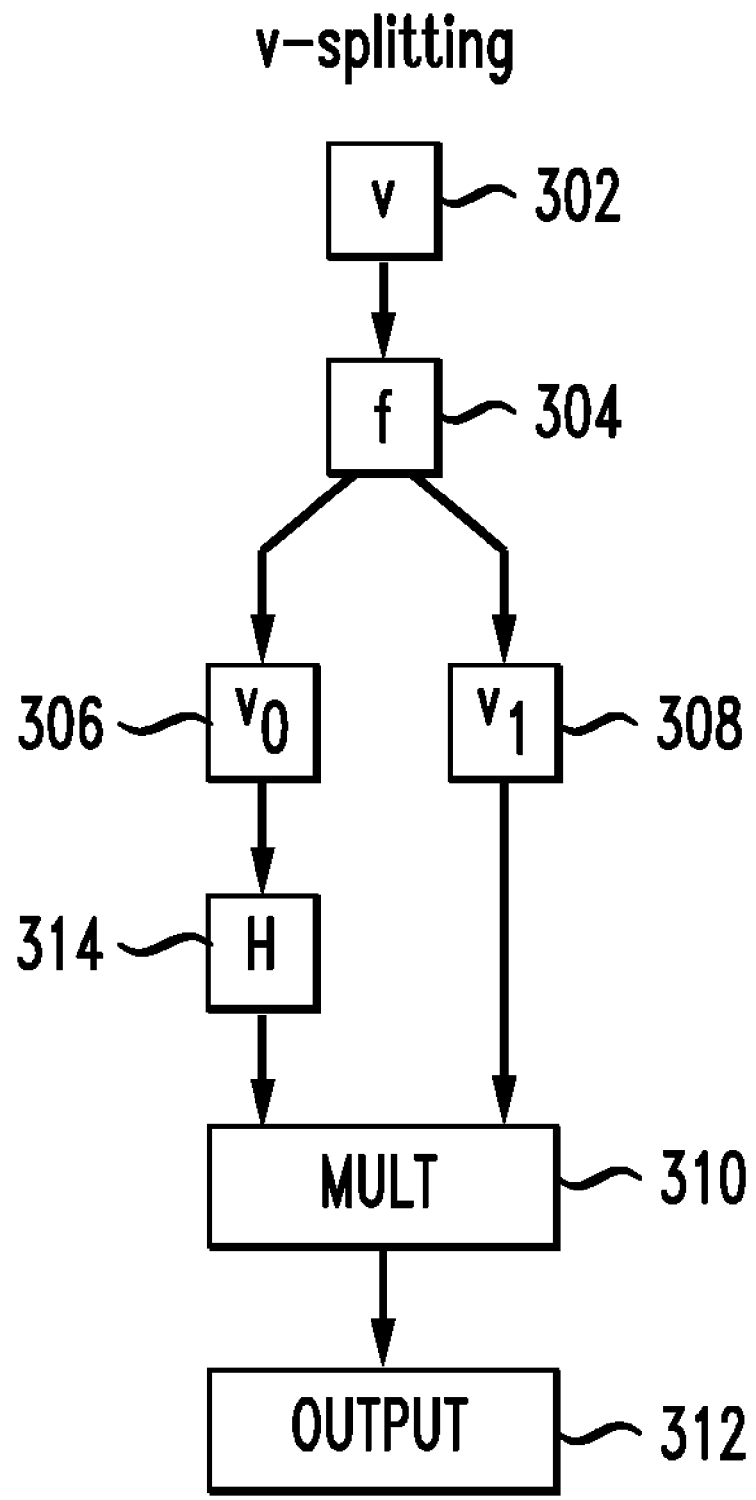
FIG. 3 illustrates a flow diagram of a splitting algorithm.

The present inventors have addressed the issue of obtaining numbers between $\{0, \ldots, L\}$ using L number of bits and propose the following process to generate larger values. Assume the input v is 512 bits in length. The process may be referred to as a v splitting process or a v-splitting operation as illustrated in FIG. 3. The 512-bit input number v is shown in block 302. Block 304 represents a splitting function that splits v into two blocks of 256 bits each as represented by $v_0$ (block 306) and $v_1$ (block 308). The notation $v_0 \| v_1$ is a concatenation of the two 256-bit blocks together into the 512 bit value v. Block 314 represents the operation of the Hamming principle on $v_0$ to generate a value $H(v_0)$. By performing this operation, the normal distribution is respected. Next, block 310 represents multiply $H(v_0)$ with $v_1$, where $v_1$ satisfies a uniform repartition in its generation. The multiplication of $H(v_0)$ with $v_1$ creates a new variable that almost satisfies the normal repartition, even if all the values are not necessarily reached. In this case, the mean and deviation have changed, but for the present implementation, this is not a problem. Conceptually this process may be applied to take private information about a person, an entity, a device, and so forth and generate a key out of that information. Having larger values for the generated key requires more complexity and resources by hackers to duplicate or identify that key.

Utilizing the splitting function, one can return back to the solution of the stochastic differential equation, and construct the function as follows. Define G to be the function that constructs the needed repartition. With an input v, the output $v_N = G(v)$. The function includes performing the splitting operation by computing $(vv_0, vv_1) = f(v)$, computing the Hamming weight $H(vv_0)$ and enlarging the repartition or the distribution by computing $v_N = H(vv_0) * vv_1$. This multiplication in this step enlarges the range of possible values thus addressing the issue of requiring a large input/output. Therefore, for a value of 0 to $2^N - 1$, the maximum size of the Hamming weight is N. In some cases, this range is too small. Because we need a normal distribution for a number, say $2^{128}$ for these applications, we use the Hamming weight, having the normal distribution property (or sufficiently like a normal distribution), and perform the multiplication by another value to enlarge the possible range of values. The returned $v_N$ value equals $G(v)$ and is used in the updater function discussed below.

The function f can be any one of a number of different functions. For instance, f can just be a split of the value v as described previously, or the function f may take the least significant bit for one part and the most significant bit for the other part of the operation, or f may be embodied in a more complex function such as an encryption or hash may be used to generate the needed size. For example, encrypting the value of v two times with the given key, then utilizing the uniform distribution, and if the two keys are different, then there is no link between the two inputs $vv_0$ and $vv_1$. In practice, the function f takes a relatively big input and produces a relatively big output to preclude a hackers attach.

Figure 2A:
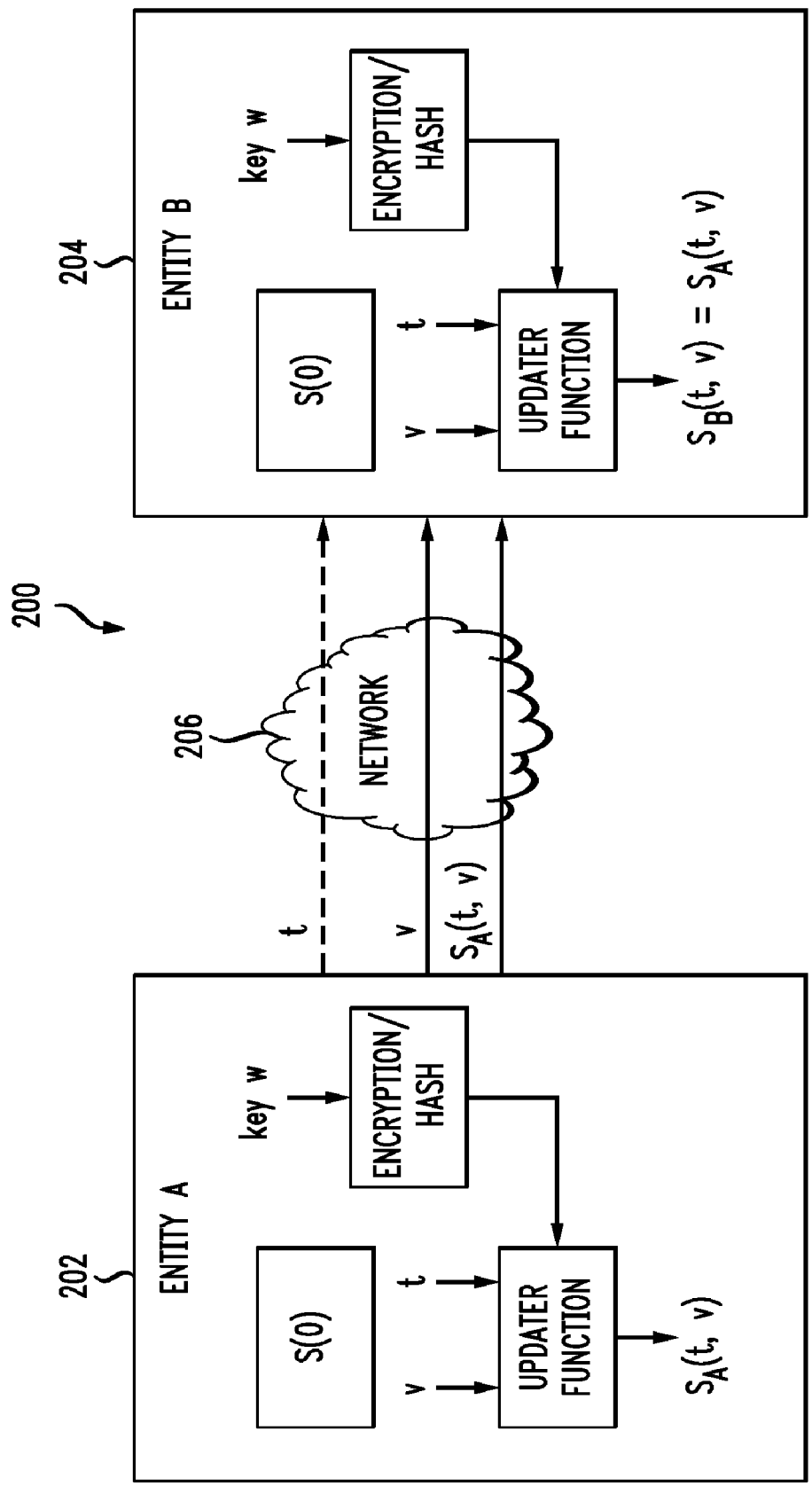
FIG. 2A illustrates the communication of data between an entity A and an entity B.

A specific and then a more generalized authentication solution utilizing the $G(v)$ will be discussed next. The input to this authentication process is the input v and the output is $S(t, v)$. FIGS. 2A and 2B illustrate respective system and method embodiments of the disclosure.

FIG. 2A illustrates an arrangement 200 with a sender entity A 202 and a receiver entity B 204. In this example, entity B 204 needs to authenticate entity A 202 or needs to authenticate the identifier v. A network 206 communicates data between the two entities and may represent any known or hereafter developed network. The discussion of the flow of data between the two entities will be provided in connection with the method embodiment of FIG. 2B. The first steps involve sharing an initial state value S(0) with the sender 202 and a receiver 204 (210) and generating a sender $S_A(t, v)$ from S(0) based on a parameter t and an identifier v (212). As shown in FIG. 2A, the identifier v is transmitted through the network 206 to the receiver 204. The method then generates a receiver $S_B(t, v)$ from S(0) based on a parameter t, the identifier v and wherein the parameter t relates to a physical value (214). Authentication of the identifier v is based on a comparison of the sender $S_A(t, v)$ and the receiver $S_B(t, v)$ (216). Preferably, the receiver 204 transmits its generated value $S_B(t, v)$ back to the sender 202 for storage and comparison with the $S_A(t, v)$. The communication in FIG. 2A of the parameter t from entity A to entity B is shown as a dotted line because, as noted above, this parameter may be sent or may be separately generated at entity B. Therefore, depending on the aspect or the embodiment being applied, t may or may not be sent. For example, if the parameter t relates to time and both the sender 202 and the receiver 204 are synchronized, then there may not be a need to send a value t but each may independently obtain the same value from a clock. The value t may also be a constant and predefined. In another aspect, the initial state values are not shared with each entity. The parameter t is shared the entity being authenticated calculates the initial state value from the parameter t and shares the initial state value with the other entity. Then, if the initial state values match, then the entity is considered authentic. This is S(t, v) which is used to authenticate.

The initial value S(0) is preferably fixed a priori as an initial state. The value S(t, v) represents the output of an updater function that may be derived from the solution to the stochastic differential equation. Therefore, the method includes sharing the initial state value S(0) with a sender and a receiver (210). At entity A 202, the method includes generating a sender $S_A(t, v)$ from utilizing S(0) based on a parameter t and an identifier v (212). The identifier v may relate to identifying the entity A as a device, a user of entity A, or some other entity or thing that needs identification. The parameter t preferably relates to time but may also relate to other values. For example, each entity A or entity B may be processing an iterative algorithm and the parameter t may relate to utilizing or generating a value based on a number of times through the iterative process. Thus, each entity can calculate the status of a particular algorithm at the given time, which values can be used for authentication. Furthermore, the parameter t may be based on some external physical values such as temperature, a current event, or some other detectable activity or event. Entity A and entity B communicate via a network 206 which may represent the internet, a wireless network, a local area network (LAN) or any other communication mechanism. General characteristics of the overall system 200 will be known to those of skill in the art.

In an alternate scenario, where entity A 202 is required to authenticate entity B 204, then v is sent to entity B 204 (and alternately t as well), and entity B 204 performs the updater function based on v and t, with the encryption or hash, and returns $S_B(t, v)$ to entity A 202. Entity A then performs the similar updater function using v and t and compares it generated value $S_A(t, v)$ to determine whether to authenticate entity B 204.

FIG. 4A illustrates an updater function that is derived from the solution to the stochastic differential equation. First, the system initializes S=S(0) and $W_t$=G(v) (402). An iterative loop is established for i from i=0 to t−1. The value i is initialized at 0 (404). The value i is compared with t−1 in step (406). If i is less than t−1, processing inside the loop begins. At step (408), $S=S*K((\mu-\sigma^2/2)*t+\sigma*W_t)$ and $W_t=W_t+G(L(W_t))$ (410). Next, i is incremented by 1 (412). While i does not equal t−1, the iterative returns to step (406) to test whether i=t−1. When i equals t−1, S is returned in step (414).

For the function K, it is preferable that rather than using the exponent function in the updater function, that function is replaced with the following function that provides a similar result in a given sense: $K(a)=z^a \mod p$, where z is derived from v.

It is proposed that arbitrary μ and σ are used. All computations are done mod p where p is not necessarily a prime number. The L function is defined as follows: L(v)=E(v, w) where E would be any encryption scheme using the key w or E may be a hashing function algorithm in which case the key w is useless.

FIG. 4B represents a more generalized version of the algorithm of FIG. 4A. In this case, an updated z is defined in each loop. The example method is shown as initializing S=S(0), $W_t$ as G(v) and z=v (420). The value i is initialized as 0 (422). The value i is compared with t−1 (424). If i is less than t−1, z=M(z) (426). The M function can be an encryption algorithm or any hash function. Next, $S=S*Z^{((\mu-\sigma 2/2)*t+\sigma*Wt)}$ (428). The system then recalculates: $W_t=W_t+G(L(W_t))$ (430). The value i is then incremented by 1 (432). The value i is again tested (424) and while i does not equal t−1, the iterations continue. When i=t−1, S is returned (434).

As is in standard authentication, the authentication is accepted if the two sides obtain the same result as is shown in FIG. 2A. Therefore, according to the principles disclosed herein, the part that is shared between the two entities is only the initial state. When authentication is established, the initial state is updated with an S(t) value in which the t is preferably based on some identifiable physical value.

As has been discussed above, another embodiment of the disclosure relates to a sender centric embodiment. Here, the method of authentication is shown in FIG. 5, the method includes receiving at a sender an initial state value S(0) that is also shared with a receiver (502). A sender S(t, v) is generated from S(0) based on a parameter t and an identifier v wherein the parameter t is based on a physical value (504). The sender S(t, v) is transmitted to the receiver, wherein the receiver authenticates the identifier v based on a comparison between the sender S(t, v) with a generated receiver S(t, v) from S(0) based on the parameter t (506). In other embodiments, the parameter t is a random value generated as has been described herein.

As has been noted above, this method may also include transmitting the parameter t from the sender to the receiver. In the embodiment where the parameter t is a physical value (as opposed to a random value), it may relate to time generally or may relate to a time associated with an event such as processing the identifier v, some external event, or some other physically detectable event or thing.

FIG. 6 illustrates a receiver centric embodiment of the disclosure. Here, the method includes receiving at a receiver an initial state value S(0) that is also shared with a sender (602). A sender S(t, v) is generated from S(0) based on a parameter t and an identifier v, wherein the parameter t is based on a physical value (604). The method also includes generating a receiver S(t, v) (606) in authenticating the identifier v at the receiver based on a comparison of the sender S(t, v) with the receiver S(t, v) and based on the parameter t (608). As has been noted above, the parameter t may relate to time or any other factor as discussed herein.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. In one aspect, the disclosure does not in each case require a physical process but may utilize other features disclosed herein and that relate to utilizing the solutions to the stochastic differential equations or other features disclosed herein. Accordingly, the appended claims and their legal equivalents should only define the invention, rather than any specific examples given.

We claim:

1. A method of authentication, the method comprising:
 sharing an initial state value $S(0)$ from a sender with a receiver;
 generating a sender $S(t, v)$ from $S(0)$ based on a parameter t and an identifier v via an updater function derived from a solution to a stochastic differential equation, wherein the updater function includes steps comprising:
  setting S equal to $S(0)$;
  setting $W_t$ equal to $G(v)$;
  performing, at each iteration in a loop of t−1 iterations, steps comprising:
   setting S equal to $S*K((\mu-(\sigma^2)/2)+\sigma*W_t)$;
   setting $W_t$ equal to $W_t+G(L(W_t))$; and
  returning S, wherein (1) $G(v)$ performs a splitting operation, Hamming weight computation and enlarging of a reparation of v and (2) $L(\ )$ is one of an encryption and a hash function;
 receiving a receiver $S(t, v)$ generated from $S(0)$ based on the parameter t and the identifier v; and
 authenticating the identifier v based on a comparison of the sender $S(t, v)$ and the receiver $S(t, v)$.

2. The method of claim 1, wherein the sender $S(t, v)$ is generated at the sender and the receiver $S(t, v)$ is generated at the receiver.

3. The method of claim 1, further comprising communicating t from the sender to the receiver.

4. The method of claim 1, wherein t is associated with time.

5. The method of claim 4, wherein t is relative to a time associated with processing v.

6. The method of claim 1, wherein the solution to the stochastic differential equation comprises:
 performing a splitting operation on the identifier v into parts $v_0$ and $v_1$;
 computing a Hamming weight for $v_0$, in which $v_0$ comprises at least a portion of identifier v; and
 enlarging a repartition of $v_0$ and $v_1$.

7. The method of claim 6, where enlarging the repartition of $v_0$ and $v_1$ comprises multiplying the Hamming weight for $v_0$ with $v_1$.

8. The method of claim 2, wherein generating the sender $S(t, v)$ and generating the receiver $S(t, v)$ are based on a replacement of a Wiener Process $W_t$ with a discrete function $G(v)$ based on a Hamming weight computation.

9. The method of claim 8, wherein the discrete function $G(v)$ further comprises:
 splitting the identifier v into parts $v_0$ and $v_1$;
 computing a Hamming weight for $v_0$, in which $v_0$ comprises at least a portion of identifier v; and
 enlarging a repartition of $v_0$ and $v_1$.

10. The method of claim 1, wherein $\mu$ and $\sigma$ are arbitrary numbers.

11. The method of claim 1, wherein the updater function derived from the solution to a stochastic differential equation is as follows:
 setting S equal to $S(0)$;
 setting $W_t$ equal to $G(L(v))$;
 setting z equal to v;
 performing at each iteration in a loop of t−1 iterations steps comprising:
  setting z equal to $M(z)$
  setting S equal to $S*z^{((\mu-(\sigma^2)/2)*t+\sigma*W_t)}$; and
  setting $W_t$ equal to $W_t+G(L(W_t))$;
 returning S, wherein (1) $G(L(v))$ performs a splitting operation, Hamming weight computation and enlarging of a reparation of L(v), (2) M( ) is an encryption function or hash function, and (3) L( ) is an encryption function or a hash function.

12. The method of claim 1, wherein t is related to one of a physical value and a random value.

13. A method of authentication, the method comprising:
receiving at a sender an initial state value S(0) that is also shared with a receiver;
generating a sender S(t, v) from S(0) based on a parameter t and an identifier v via an updater function derived from a solution to a stochastic differential equation, wherein the updater function includes steps comprising:
setting S equal to S(0);
setting $W_t$ equal to G(v);
performing, at each iteration in a loop of t−1 iterations, steps comprising:
setting S equal to $S*K((\mu-(\sigma^2)/2)+\sigma*W_t)$;
setting $W_t$ equal to $W_t+G(L(W_t))$; and
returning S, wherein (1) G(v) performs a splitting operation, Hamming weight computation and enlarging of a reparation of v and (2) L( ) is one of an encryption and a hash function; and
transmitting the sender S(t, v) to the receiver, wherein the receiver authenticates identifier v based on a comparison of the sender S(t, v) with a generated receiver S(t, v) from S(0) based on the parameter t.

14. The method of claim 13, wherein the sender S(t, v) is generated at the sender and the receiver S(t, v) is generated at the receiver.

15. The method of claim 13, further comprising transmitting t from the sender to the receiver.

16. The method of claim 13, wherein t relates to time.

17. The method of claim 16, wherein t is relative to a time associated with processing v.

18. The method of claim 13, wherein t is based on one of a physical value and a random value.

19. A method of authentication, the method comprising:
receiving at a receiver an initial state value S(0) that is also shared with a sender;
receiving a sender S(t, v) from S(0) based on a parameter t and an identifier v, wherein the sender S(t, v) is generated via an updater function derived from a solution to a stochastic differential equation, wherein the updater function includes steps comprising:
setting S equal to S(0);
setting $W_t$ equal to G(v);
performing, at each iteration in a loop of t−1 iterations, steps comprising:
setting S equal to $S*K((\mu-(\sigma^2)/2)+\sigma*W_t)$;
setting $W_t$ equal to $W_t+G(L(W_t))$; and
returning S, wherein (1) G(v) performs a splitting operation, Hamming weight computation and enlarging of a reparation of v and (2) L( ) is one of an encryption and a hash function;
generating a receiver S(t, v); and
authenticating the identifier v at the receiver based on a comparison of the sender S(t, v) with the receiver S(t, v) and based on the parameter t.

20. The method of claim 19, wherein the sender S(t, v) is generated at the sender and the receiver S(t, v) is generated at the receiver.

21. The method of claim 19, further comprising receiving t from the sender at the receiver.

22. The method of claim 19, wherein t relates to time.

23. The method of claim 19, wherein t is relative to a time associated with processing the identifier v.

24. The method of claim 19, wherein t is based on one of a physical value and a random value.

* * * * *